S. G. BROWN.
ELECTRICAL TRANSLATING DEVICE.
APPLICATION FILED APR. 17, 1918.
1,318,535.
Patented Oct. 14, 1919.
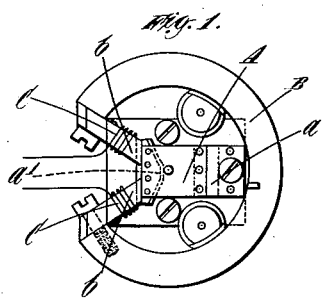
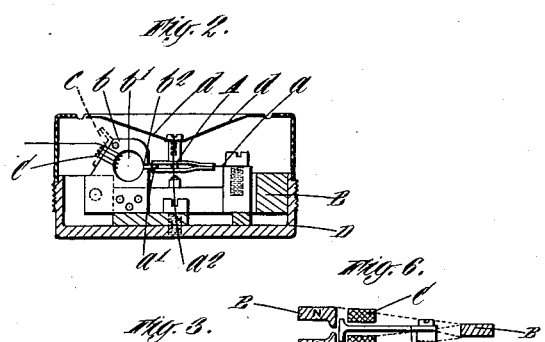
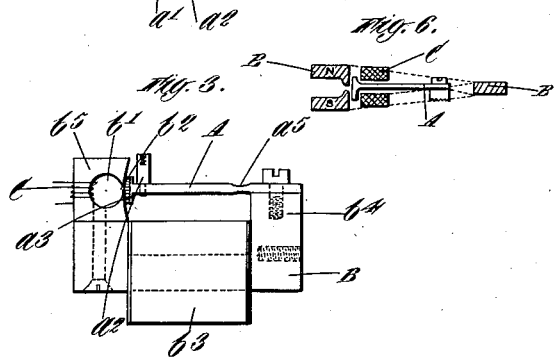
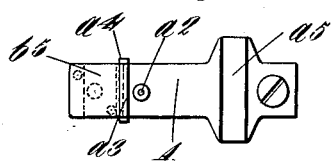
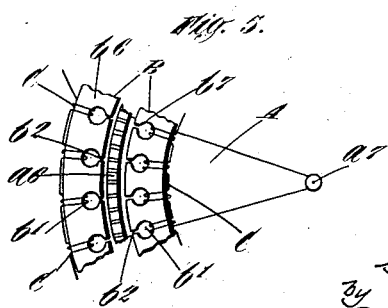
Inventor.
Sidney G. Brown

UNITED STATES PATENT OFFICE.

SIDNEY GEORGE BROWN, OF NORTH ACTON, ENGLAND.

ELECTRICAL TRANSLATING DEVICE.

1,318,535.      Specification of Letters Patent.      Patented Oct. 14, 1919.

Application filed April 17, 1918. Serial No. 229,099.

*To all whom it may concern:*

Be it known that I, SIDNEY GEORGE BROWN, a subject of the King of Great Britain, residing at Edward Road, Willesden Lane, North Acton, England, have invented certain new and useful Improvements in Electrical Translating Devices, of which the following is a specification.

This invention relates to telephone and like receivers or relays adapted as translating devices for use with variable current of small amplitude, of the type in which a vibrating magnetic member, such as a reed, is placed in a magnetic field varied by the received currents. The chief object of the present invention is to construct a telephone receiver or like translating device with minimum elasticity whereby clear speech is obtained owing to the absence of resonance and to enable the strength of the magnetic field to be greatly increased, so as to improve the efficiency and sensitiveness of the receiver. In a receiver of this type as previously employed the magnetic field acted transversely upon the reed so as to exert a bending action and, as the stiffness of the reed was limited in order to respond to the small oscillatory changes in the field due to the received current, the field itself was limited in strength in accordance with the required elasticity of the reed.

According to this invention the magnetic field acts longitudinally upon the vibrating member or reed, so as to exert a direct pull from its base or point of support, while the received current has a transverse action and effects the vibration of the reed across the main field. The elasticity of the reed is therefore independent of the magnetic field, which may if desired be strong enough to bring the reed or equivalent vibrating member up to saturation point. The reed may be of laminated iron to get sufficient flexibility and may be excited by a permanent magnet or by an electromagnet.

In order that the said invention may be clearly understood and readily carried into effect, I will describe the same more fully with reference to the accompanying drawings, in which:—

Figures 1 and 2 show respectively in plan and transverse section a telephone receiver embodying my invention.

Figs. 3 and 4 are respectively an elevation and a plan of a modified construction, and Figs. 5 and 6 show two further modifications.

A is the vibrating reed. B is the magnet. C is the receiving coil.

Referring to Figs. 1 and 2 the magnet B is shown of circular form with a gap at one side, on the two ends of the magnet being secured the pole pieces $b$ of laminated iron, each of which is formed with the channel $b'$ opening opposite the reed A through the narrow gap $b^2$. The reed A is built up of two thin plates, which may be of aluminum alloy, riveted to a very flexible and much thinner sheet $a$ of tempered steel forming a flexible hinge or fulcrum.

Between the plates at their front end is secured a small armature $a'$ built up of very thin iron stampings separated by thin copper plates. The iron stampings may have a thickness of say 3 mils. and the separating copper plates a thickness of about 2 mils., the armature comprising about eight iron stampings in the case of a reed suitable for a telephone receiver. The object of the separating copper plates is to reduce the spreading of the magnetic lines so that they are maintained as nearly longitudinal as possible in the reed A. It has been found that this method of building up the reed gives better regulation on the receiver. This armature lies immediately opposite the gaps $b^2$ of the pole pieces $b$, the magnetic field passing between the poles $b$ through the armature $a'$. The receiving coil C is wound around both of the poles $b$, passing through the channels $b'$, a small flanged strip $c$, shown in dotted lines in Fig. 2, serving to hold the winding in place.

As shown in Fig. 2 the device is inclosed within the case D carrying the diaphragm $d$ which is attached to the vibrating reed A by means of the stud $a^2$. The case and diaphragm are removed in Fig. 1 in order to show the interior of the receiver.

It will be seen that the pull of the magnet B upon the reed A is purely longitudinal, so that a considerable force can be exerted since the pull has no tendency to deflect the reed and in fact maintains it in a centralized position. On speech currents passing through the receiving coil C the magnetic field at the gap $b^2$ in each of the magnet pole pieces $b$ is disturbed and transverse forces are set up which cause the reed to vibrate.

In the modification shown in Figs. 3 and 4 the magnet B is shown in the form of an electromagnet provided with the exciting coil $b^3$, and the reed A is mounted at one end upon one pole $b^4$ of the magnet, the magnetic circuit passing longitudinally through the reed to the opposite pole piece $b^5$ on which the receiving coil C is wound, this pole piece having a channel $b'$ and gap $b^2$ as in the previous case. The end piece $a^3$ of the reed is sufficiently deep to cover the gap $b^2$ and a portion of the pole piece $b^5$ at each side of the gap, the end piece $a^3$ being slotted in its face to receive a number of small copper strips $a^4$. To give flexibility to the reed it is formed with a neck $a^5$ of reduced thickness, the thin neck portion being widened to prevent undue resistance to the magnetic flux.

The action of the device shown in Figs. 3 and 4 is very similar to that shown in Figs. 1 and 2, the pole $b^5$ exerting a considerable pull on the reed while the effect of the speech currents through the coil C is to cause the reed to vibrate transversely.

In the modification shown in Fig. 5 the magnet is made with two concentric pole pieces $b^6$ and $b^7$ both formed with a series of channels $b'$ and gaps $b^2$. The reed A in this case consists of an arm carrying at its end a curved iron flange or strip $a^6$ which projects into the gap between the two poles $b^6$ and $b^7$ a small clearance only being allowed on each side of the flange $a^6$. The two receiving coils C are wound through the channels $b'$ and the reed flange $a^6$ is divided by a series of copper or other non-magnetic conductors. The action of the poles $b^6$, $b^7$ is to exert a radial pull upon the flange $a^6$ of the vibrating member or reed, which may be pivoted at the opposite end $a^7$ while the transverse vibrations are caused by speech currents in the coils C. The principle upon which this modification is constructed is therefore the same as that embodied in the other forms already described.

As shown in Fig. 6 a receiving coil C or coils may be provided on the end of the reed A instead of or as well as on the magnet B, but usually the coil or coils would be placed on the magnet alone, where they are not subject to vibration. The reed may be connected to a telephone diaphragm as shown in Fig. 2 or as is obvious to a microphone or other relay according to the use to which the device is to be put. Such connections form no part of the present invention and are not illustrated.

What I claim and desire to secure by Letters Patent of the United States is:—

1. In an electrical translating device as set forth, a magnet, a vibratory member held at one end and having its free end closely adjacent to a pole of the said magnet, whereby the magnet exerts a strong permanent longitudinal pull on the said member, and a receiving coil adapted to act transversely upon the main magnetic field and to effect oscillation of the vibratory member, the permanent longitudinal pull being large compared to the transverse forces due to the coil.

2. A device as claimed in claim 1, in which the aforesaid vibratory member is in the form of a reed comprising a comparatively rigid flat strip having a flexible hinge portion.

3. In an electrical translating device of the kind set forth, a magnet, a vibrating reed comprising a plurality of thin plates, a flexible hinge strip upon which the plates are mounted, and a small armature on the outer end of the said plates, the said reed having its end closely adjacent to a pole of the magnet so that the latter exerts a substantial permanent longitudinal pull on the reed.

4. In an electrical translating device of the kind set forth, a vibratory member, a permanent magnet the two poles of which are adjacent to the same end of the said member and exert a longitudinal pull on the said member and a receiving coil adapted to act transversely on the magnetic field.

5. In an electrical translating device of the kind set forth, a vibratory member, a magnet having channeled pole pieces adjacent to the free end of the vibratory member and adapted to exert a strong permanent pull longitudinally of the said member, and a receiving coil wound through the pole channels.

6. A telephone receiver comprising a vibratory member, a magnet having a pole closely adapted to the free end of the said vibratory member so as to exert a strong permanent pull longitudinally of the said member, a receiving coil in the telephone circuit adapted to act transversely upon the main magnetic field, a diaphragm and a connection between the diaphragm and the vibratory member.

SIDNEY GEORGE BROWN.